April 17, 1934.  H. DUCHATELLIER  1,955,116
PHOTOGRAPHIC RECONSTRUCTION APPARATUS
Filed Nov. 22, 1929
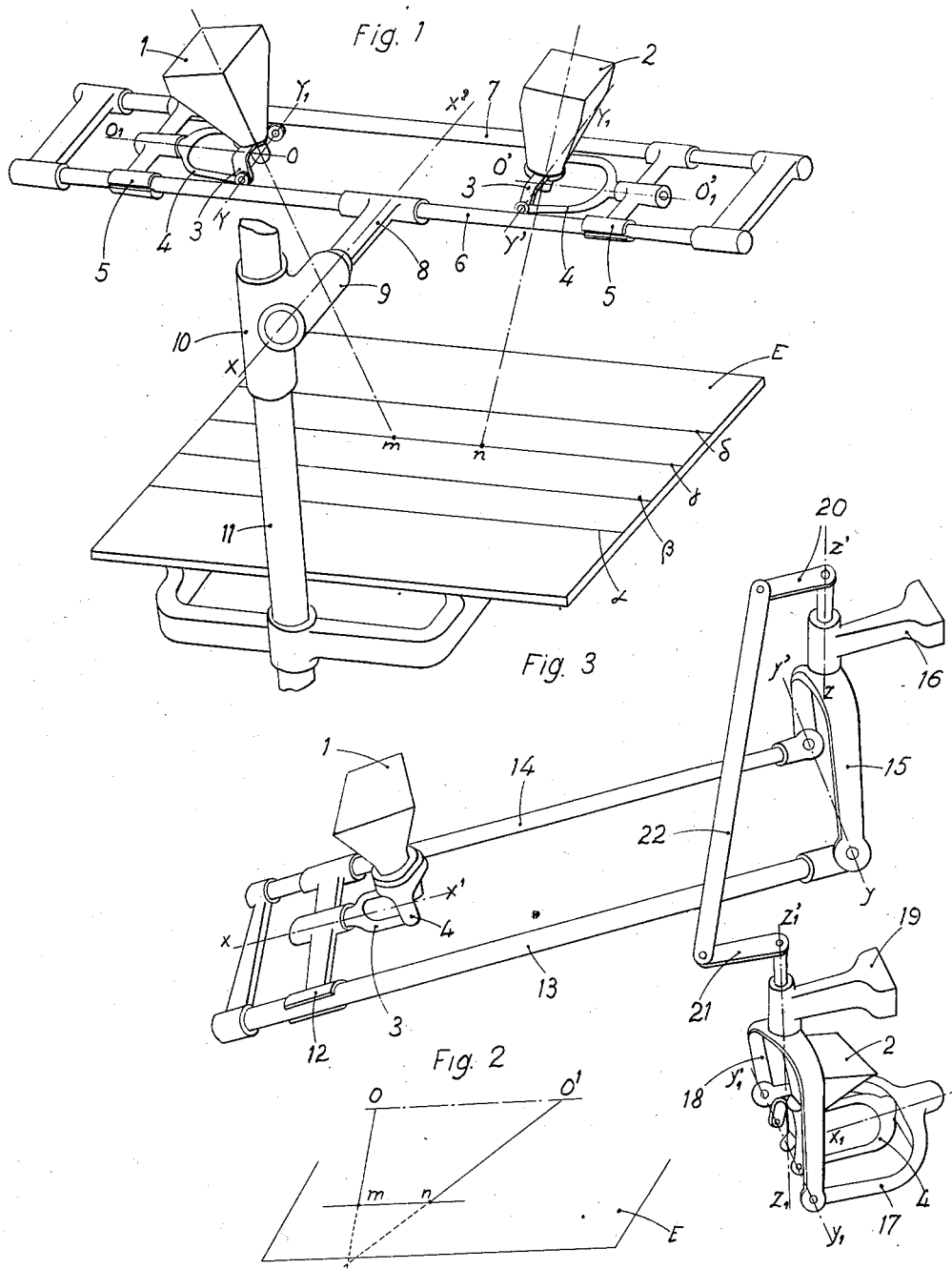

Patented Apr. 17, 1934

1,955,116

UNITED STATES PATENT OFFICE 1,955,116

PHOTOGRAPHIC RECONSTRUCTION APPARATUS

Henry Duchatellier, Courbevoie, France, assignor, by mesne assignments, to L'Aerotopographie, Courbevoie, France, a corporation of France Application November 22, 1929, Serial No. 409,112
In France November 30, 1928

7 Claims. (Cl. 88—24)

The present invention relates to a device which makes it possible to locate the respective positions which two points occupied at the moment of taking their photographs. Two negatives which represent the same portion of ground photographed from any desired points are used and placed into cameras provided with indentical lenses or having the same principal distance as those which were used for taking the photograph. It is by this positioning of the negatives that makes possible photographic reconstruction of an observed portion of the ground. This operation comprises, in addition to the positioning in their relative place the cameras containing the negatives also, a positioning of the whole relatively to the screen representing a horizontal plane of the ground. The reconstruction of a point takes place at the point of intersection of the homologous rays coming from the two lenses; in order to obtain these different points on the screen, after the positioning has been effected, it is sufficient to give the screen a movement of translation proportional to the difference of altitude between these various points.

In order to effect the required positioning, it was as a rule heretofore attempted to effect the positioning of each camera relatively to the screen, by using at least three points of the ground surveyed with precision on the desired scale. But the problem thus put is a very delicate one and requires a very great precision in the surveying or taking of the points.

Another more rational method consists in previously effecting the positioning in place of the cameras, one relatively to the other, without taking into account either the position of the horizontal planes, or the desired scale. It is sufficient then, for obtaining first the reconstruction to scale, to give one camera a suitable motion of translation along the line of the centres of projection, so as to increase or to reduce the distance between the cameras, and for obtaining then the reconstruction in correct position relatively to the horizontal plane, to move the cameras as a whole relatively to the screen. For the reconstruction to scale, it is sufficient to use the known distance of two points of the ground, and for the positioning of the horizontal planes, of the heights of three points. The problems thus put are easy to solve.

My invention provides a device by means of which cameras containing the negatives can be positioned in accordance with the last method hereinbefore set forth.

The accompanying drawing shows by way of example a construction according to the invention.

Figure 1 shows one view of the apparatus.

Figure 2 is a diagrammatic representation of one position of the cameras and screen.

Figure 3 shows a mechanism for moving one camera relatively to the other when the apparatus is based on stereoscopic vision.

The apparatus comprises a mechanism supporting the cameras 1 and 2 provided with lenses, the centres of which are at O and O'; when the positioning in relative place of the cameras has been effected, the homologous rays coming from the two lenses which pass respectively through O and O' must meet. It will be ascertained that the rays of a certain number of points must meet by means of the screen, but the observation will be simplified by observing that for this verification, it is unnecessary that the screen should pass through the points of intersection, for if this condition is not fulfilled, it is sufficient that the traces of the rays should be on a straight line parallel to O O' in order to make sure that these rays will meet as shown in Figure 2; because if the traces $m$, $n$ of two rays passing respectively through O and O' are on a straight line parallel to O O', the straight line $m$ $n$ and O O' will be in one and the same plane which contains the two rays in question, and it follows therefrom that these two rays meet at a point A. Consequently in order to effect the positioning in relative place of the cameras 1 and 2, a screen E parallel to O O' will be used on which is drawn a network of straight lines $\alpha$, $\beta$, $\gamma$, $\delta$ parallel to O O', and it will be verified that two corresponding rays have their traces on one and the same straight line without it being necessary for this operation to move the screen by a movement of translation relatively to O O'. This suppression or elimination results in a considerable saving of time; it is necessary in fact in order that the positioning should be exact, that six points of one of the negatives should coincide with six points of the other, and it is necessary to pass constantly and a great number of times from the one to the other. It will be seen however that instead of tracing on the screen a network of parallel straight lines, it is possible to use only one straight line forced to move on the screen parallel to itself, this straight line being obtained by means of a suitable device for instance a thread or by the edge of a ruler. It is further possible to trace on the screen a single straight line and to obtain its movement by a translation of the screen in its own plane.

In the apparatus illustrated, the cameras are mounted on parts 3 in such a manner as to enable them to be turned about the optical centre of the lens.

The parts 3 are articulated to forks 4 in such a manner as to produce for the whole of the camera a rotation about axes $Y—Y_1$, $Y'—Y_1'$ preferably passing respectively through the points $O—O'$.

These forks 4 can rotate in parts 5 about the axes $O—O_1$, $O'—O_1'$ at right angles to the axes $Y—Y_1$, $Y'—Y_1'$ and also passing through the points O and O'.

The parts 5 finally slide on perfectly straight tubes 6 and 7. These tubes 6 and 7 are rigidly secured together and supported as a whole by a part 8 which can turn about an axis $X—X'$ at right angles to the tubes 6 and 7.

The part 8 rotates in a sleeve 9 which can move vertically being integral with the part 10 to which it is connected and which can slide on a vertical tube 11. This vertical tube 11 is rigidly secured to a horizontal screen E. For the positioning, first the tubes 6 and 7 will be rotated about the axle $X—X'$ in order to bring O and O' to the same height above the plane E.

Owing to the forks 4 and to the parts 3, the axes of the cameras can be moved in every direction about O and O'. The tilting of the plate is regulated also by turning the said cameras about their axes. All of these movements are regulated in such a manner that in the case of the screen comprising a network of straight lines, all the pairs of corresponding rays issuing from O and O' shall be caused to have their traces $m$ $n$ situated on one and the same straight line of the plane E, the said straight line depending on the pair of corresponding rays considered. In the event of there being only one straight line, whether secured to the screen or not, the movements of the cameras are regulated so as to enable the movable straight line to be caused to pass successively through the traces of all the pairs of corresponding rays.

When this condition is fulfilled, the two cameras will be in correct position relatively to one another, that is to say their relative orientation has been suitably effected.

The distance between the cameras will then be read on a graduation not shown which could be provided on one of the tubes 6 or 7, by means of verniers placed on the parts 10.

By causing then the part 10 to slide on the tube 11, it will be possible to bring the traces of two rays to coincide. The height of the cameras will be read on a graduation not shown which is provided on the tube 11. Two other rays will then be made to coincide by changing again the altitude of the part 10. The altitude will be read again. The distance of the points where the rays met successively on the screen E, will then be measured. Knowing their horizontal distance and their difference of altitude, their distance in space will be calculated; this distance should be that which separates the two points supposed to be known on the ground, reduced to the scale of the map which it is proposed to trace.

If such is not the case, the two cameras will be given a distance apart, the proportion between which and the distance previously read must be equal to the proportion between the distance of the points on the scale of the map and their previously calculated distance.

The ground is then reconstructed in space to the desired scale, it remains to place it in correct position relatively to the horizontal plane. To that end, the altitudes of three of its points being known and reduced to scale, the cameras as a whole will be turned about $X—X'$ and the two cameras to one and the same angle about $O—O_1$ and $O'—O_1'$ (which rotations will not change in any way their relative position) until the heights of the points which can be read on the graduation of the tube 11, are the real heights.

Certain apparatus necessitate an additional movement of one of the cameras relatively to the other by a movement of translation, and the corresponding straight lines determining the reconstructed point, instead of intersecting each other, must pass respectively through the two ends of a segment of straight line parallel and equal to the said translation. This device is generally utilized in apparatus based on stereoscopic vision.

In the event of one of the two cameras having been moved as just described, their connection can be effected as illustrated in Figure 3.

The camera 1 is articulated as in the previous connection about a fork 4 rotating about an axis $x—x'$ in a part 12 which slides along two tubes 13 and 14 parallel to $x—x'$. The tubes 13 and 14 are articulated to a fork 15 in such a manner that their whole as well as the camera should be able to pivot about an axis $y—y'$. The fork 15 in its turn pivots about an axis $z—z'$ in a bearing supported by a fixed part 16. The axes $y—y'$ and $z—z'$ intersect each other.

The camera 2 is also articulated in a fork 4 which pivots in the interior of a second fork 17 about an axis $x_1—x_1'$. This fork 17 is articulated about the axis $y_1—y_1'$ on a vertical fork 18 identical with the fork 15. The fork 18 pivots about an axis $z_1—z_1'$ in a bearing supported by a fixed part 19. The axes $y_1—y_1'$ and $z_1—z_1'$ intersect each other.

The axes $z—z'$ and $z_1—z_1'$ are made parallel, as well as the axes $y—y'$ and $y_1—y_1'$. The segment of straight line connecting together the points of intersection of the axes $z—z'$, $y—y'$ and $z_1—z_1'$, $y_1—y_1'$ represents as regards size and direction, the movement of translation which has been given to the camera 2.

If the axes $z—z'$ and $z_1—z_1'$ are connected together by levers 20 and 21 and a connecting rod 22, the forks 15 and 18 will describe equal rotations about their vertical axes.

The fork 17 can be regulated in such a manner that the axis $x_1—x_1'$ will be parallel to the axis $x—x'$ by connecting the axis $y_1—y_1'$ of the fork 17 to the axis $y—y'$ of the tubes 13 and 14; for instance by a double Cardan joint, the central section of which carries a slot (the Cardan joint is not shown in the drawing) it is possible to arrange that the fork 17 will always turn about $y_1—y_1'$ to an angle equal to that to which the tubes 13 and 14 turn about $y—y'$.

It will be understood that with such an arrangement, the camera 2 will always remain in correct position relatively to the camera 1 as if the movement which has been given to the camera 2 did not exist.

I claim:

1. An apparatus for photographic reconstruction of ground comprising a base, a standard rising therefrom, a frame comprising two parallel straight tubes rigidly secured together at their ends and a supporting rod rigidly joined to one of said tubes, said rod being pivoted on the standard to oscillate in a vertical plane, two parts longitudinally slidable on the tubes each carrying a fork pivoted to said part, both forks to oscillate on axes parallel to said tubes, a camera pivoted in each fork to oscillate on an axis at right angles to said rod, said cameras having the optical centers of their lenses in the axes of their pivots.

2. An apparatus as claimed in claim 1, in which the base comprises a screen having a system of straight lines lying in planes parallel to the line joining the center of the camera lenses.

3. An apparatus for photographic reconstruction of ground comprising a base, a screen supported thereon, a standard fixed to the base and extending therefrom perpendicularly to the plane of the screen, an elongated frame, means for mounting the frame on the standard to allow the said frame to be adjusted longitudinally of the standard and to be adjusted angularly about an axis perpendicular thereto, two cameras and means for mounting each camera on the frame to move longitudinally thereof and to oscillate about two axes perpendicular to each other, the said axes passing through the optical centers of the lens of the camera.

4. An apparatus according to claim 3 in which the said frame is angularly adjustable about the said standard.

5. An apparatus for photographic reconstruction of ground comprising two cameras, means for supporting the said cameras permitting them to be moved toward or away from each other and permitting each to be individually adjusted angularly about two axes perpendicular to each other and passing through the optical center of the lens of the camera, a base, a screen supported by the base and means for adjusting the distance and the angular relationship between the said screen and the said camera supporting means without disturbing the positions of the cameras relative to one another.

6. An apparatus for photographic reconstruction of ground, comprising an elongated frame, two carriages mounted for longitudinal movement on said frame, a camera mounted on each of said carriages by a universal joint permitting the camera to tilt in any direction about the optical center of its lens, a base supporting a screen and means for adjustably positioning the said frame at different distances from the said base and in variable angular relationship thereto.

7. In a method of photographically reconstructing ground, the steps which comprise angularly adjusting two cameras containing negatives to bring two homologous rays coming from the lenses of the cameras into the same plane and into proper angular relationship but without moving the focal centers of the lenses, adjusting the distance between the cameras to obtain the proper reconstruction scale and orienting both cameras conjointly relative to a screen without changing their position relative to one another to bring the projected image on the screen.

HENRY DUCHATELLIER.